US006276193B1

(12) United States Patent
Benjey

(10) Patent No.: US 6,276,193 B1
(45) Date of Patent: Aug. 21, 2001

(54) DETECTING VAPOR LEAKAGE IN A MOTOR VEHICLE FUEL SYSTEM

(75) Inventor: Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/636,201

(22) Filed: Aug. 10, 2000

(51) Int. Cl.[7] ........................ G01M 3/08

(52) U.S. Cl. ........................ 73/40.5 R; 73/49.7; 73/118.1; 123/519

(58) Field of Search ........................ 73/40, 40.5 R, 73/49.7, 118.1; 116/266, 267, 268, 269, 270, 271, 272, 279

(56) References Cited

U.S. PATENT DOCUMENTS 3,584,500 * 6/1971 Diehl et al. .................. 73/39
4,205,702 * 6/1980 Silverwater .................. 137/557
4,512,278 * 4/1985 Winther .................. 116/34 R
5,054,508 * 10/1991 Benjey .................. 137/43
5,263,462 * 11/1993 Reddy .................. 123/520
5,275,144 * 1/1994 Gross .................. 123/520
5,524,662 * 6/1996 Benjey et al. .................. 137/43
5,635,630 * 6/1997 Dawson et al. .................. 73/40.5 R
5,992,396 * 12/1999 Krimmer et al. .................. 123/519
6,073,487 * 6/2000 Dawson .................. 73/118.1
6,182,642 * 2/2001 Ohkuma .................. 123/520

* cited by examiner

*Primary Examiner*—Hezron Williams
*Assistant Examiner*—C D Garber
(74) *Attorney, Agent, or Firm*—Roger A. Johnson

(57) ABSTRACT

A remotely actuatable diagnostic valve biased normally open is disposed in the air inlet of a vehicle fuel tank vapor storage canister and a thermistor disposed to sense vapor temperature above the liquid level in the fuel tank. Upon engine shutdown, the valve is remotely actuated to close. When the fuel vapor in the tank cools to form a vacuum in the tank, the vacuum overcomes the valve bias and holds the valve shut when the valve is remotely de-actuated. A valve position sensor provides confirmation that the valve has been held shut by the vapor vacuum when the valve is de-actuated. If a leak exists the vacuum will be insufficient to hold the valve closed after remote de-actuation; and, the valve is biased open, whereupon the valve position sensor provides a fault indication signal.

13 Claims, 4 Drawing Sheets

DETECTING VAPOR LEAKAGE IN A MOTOR VEHICLE FUEL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

In the manufacture of motor vehicles and particularly vehicles powered by motors burning liquid fuel such as gasoline, it has recently been required to provide an on-board diagnostic system for detecting malfunction or leakage of the fuel vapor emission control system on the vehicle.

This requirement for on-board diagnostics of the fuel vapor emission system has resulted in the need to detect fuel vapor leaks in the fuel tank, vapor storage canister and the canister purge valve and venting conduits connecting the fuel tank with the storage canister, in addition to the purge control valve connecting the canister to the engine inlet for purging fuel vapors from the storage canister to the engine during operation.

With the advent of electrically controlled fuel injectors for motor vehicle engines, it has been possible to provide electronic management of combustion in the engine with an electronic controller, which includes electrically controlling the feed of fuel vapor from a storage canister into the engine during operation. Thus, an electrically operated purge control valve on the canister has been employed.

Furthermore, requirements for minimizing the escape of fuel vapors during refueling operations; and, requirements that the vent for the vapors from the tank to the canister be closed in the event of vehicle rollover, have all created a need for valving arrangements which must be installed through openings either in the tank or the filler neck or in the lines from the tank to the storage canister. In addition, the advent of electric fuel injectors has resulted in electrically operated fuel pumps installed through an access opening in the fuel tank. Thus, the complexity of the fuel supply and vapor emission control system has resulted in numerous connections and seals which may become subject to leakage in prolonged service due to vibration and deterioration of the materials employed. Leakage has been a problem particularly where plastic materials are used which may be subject to absorption and swelling after prolonged exposure to the fuel.

Thus, it has been required to provide a way of detecting the failure of the vapor integrity of the fuel and vapor vent system or, in other words, provide the ability to detect leakage in any of the components employed in the fuel/fuel vapor emission control system. Leakage of fuel vapor under positive pressurization can also occur when the ambient conditions reach elevated temperatures particularly as may result from proximity of the fuel tank to the engine exhaust system. Leakage of atmospheric air into the fuel system can also occur as the system may be subjected to sub-atmospheric pressure resulting from cooling after prolonged usage in warm climate conditions and particularly in such conditions where the tank is normally warmed by proximity to the engine exhaust system.

Thus, it has been desired to provide a simple, relatively low cost way of detecting the presence of vapor leakage in the vehicle fuel/fuel vapor emission control system and to provide an indication of leakage in order that the vehicle operator may have the faulty condition serviced.

BRIEF SUMMARY OF THE INVENTION

The present invention solves the above-described problem of detecting leakage in the fuel vapor emission control system of a motor vehicle by providing an electrically operated diagnostic valve in the purge air inlet of the vapor storage canister employed for storing fuel vapors during periods of engine shutdown. The diagnostic test valve is electrically operated and is controlled by the electronic engine operations/emission controller and thus minimizes the cost of providing on-board diagnostic ability to detect vapor leakage in the fuel vapor emission control system.

The present invention includes a remotely actuatable diagnostic valve and a temperature sensor disposed in the tank for sensing the temperature of the fuel vapor in the tank. Following engine shutdown, the diagnostic valve biased open is remotely actuated and closed and held closed until the temperature sensor indicates that the temperature of the vapor in the tank has cooled by a predetermined amount. The diagnostic valve is then remotely de-actuated; and, if sufficient sub-atmospheric pressure (vacuum) exists in the fuel vapor due to cooling, the sub-atmospheric pressure acts on the diagnostic valve overcoming the bias to maintain the valve in a closed position. A means for detecting the valve position is provided and which provides an electrical signal to the controller indicating the presence of the sub-atmospheric pressure (vacuum) and thus the integrity of the vapor emission system is confirmed. However, if upon remote de-actuation of the diagnostic valve, the valve position detector indicates that the valve has returned to the open position under the bias of the spring, the system controller is operative to determine that leakage has occurred and provides a fault indication to the vehicle operator.

In the presently preferred practice, the diagnostic valve is solenoid operated; and, the valve position detector employs a means for electrically determining the solenoid armature/valve position either by electrically determining the inductance of the solenoid in the de-energized and energized state, or in an alternative embodiment, the solenoid armature actuates or de-actuates a switch when it is in the closed position. The present invention thus provides a unique and novel yet simple and relatively low cost technique for diagnosing the presence of leakage in the fuel vapor emission control system on a motor vehicle.

DETAILED DESCRIPTION OF THE INVENTION

Figure 1:
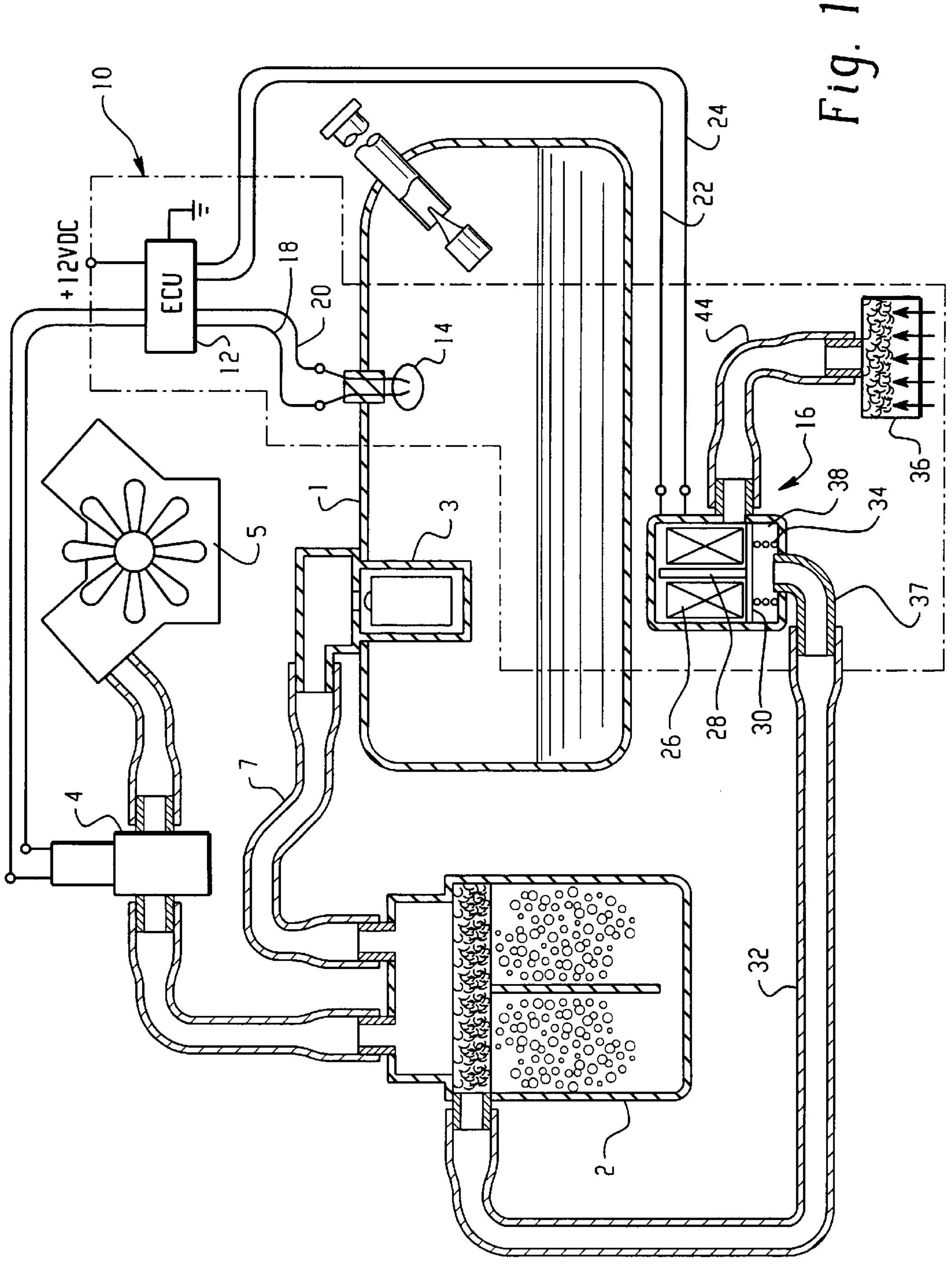
FIG. 1 is a pictorial schematic of the invention employed in the fuel tank/vapor emission control system of a motor vehicle.

Referring to FIG. 1, the present invention is illustrated as embodied in a motor vehicle fuel tank and vapor emission control system employing a fuel tank 1 and a vapor storage canister 2, a float-type rollover valve 3, and a vapor management valve 4 connected for controlling flow of fuel vapor to the inlet of the engine 5. Typically the canister is connected via conduit 7 and valve 3 disposed in the interior of the tank 1 in the vapor dome above the liquid level. The invention is indicated generally at 10 and includes an electronic controller 12, a temperature sensor 14 connected to sense fuel vapor temperature in the top of the tank 1 and a remotely actuated diagnostic valve indicated generally at 16.

In the presently preferred practice, the temperature sensor 14 comprises a thermistor connected to the controller or ECU 12 by leads 18, 20.

The diagnostic or test valve 16 is connected to the controller 12 via leads 22, 24 and is preferably operated by a solenoid coil 26 effective for moving an armature 28 connected to a valve member 30 moveable with the armature for opening and closing conduit 32 connecting the valve to the inlet of canister 2. A spring 34 biases valve member 30 to the open position by a predetermined force correlated to a desired vacuum or sub-atmospheric pressure in the canister 2. The valve 16 has its inlet connected through a filter 36 to the atmosphere.

Valve 16 has the moveable valve member 30 thereof disposed in a valve body in a valving chamber 38 formed about the end of a port tube connected to conduit 32 and thus renders the valve member 30 responsive to the fluid pressure in the valving chamber when closed on the port tube 37.

Figure 3:
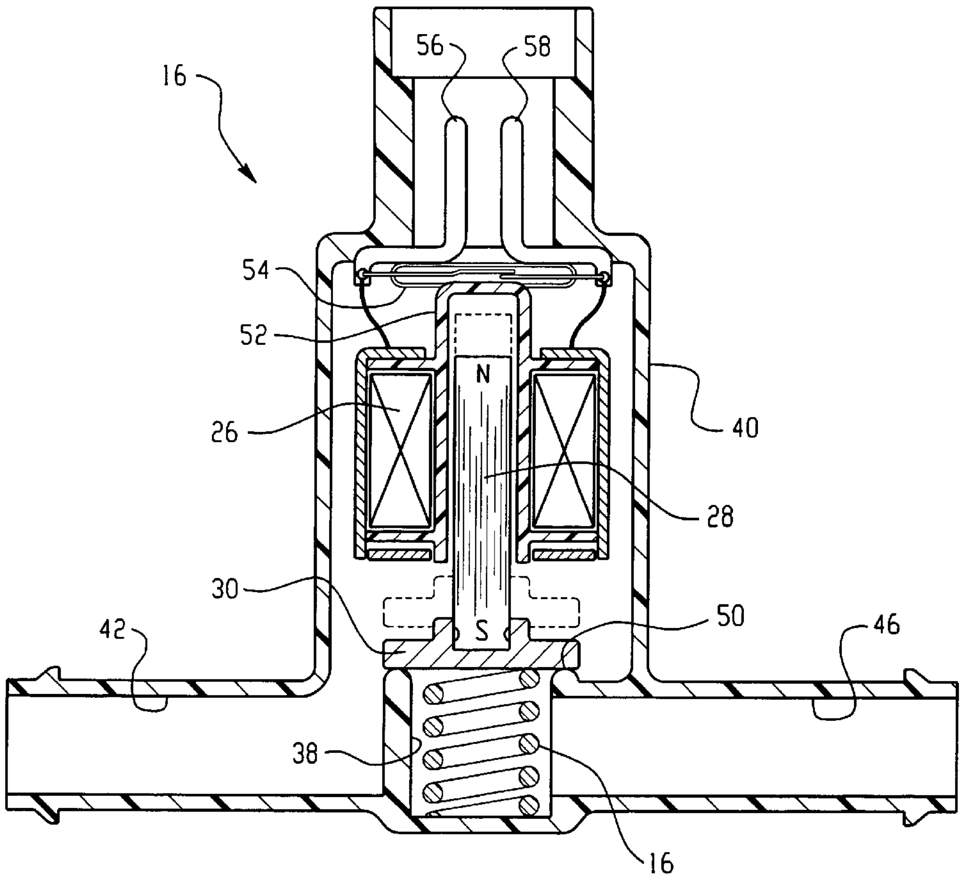
FIG. 3 is a cross-section of one embodiment of the diagnostic valve of FIG. 1.

Referring to FIG. 3, the diagnostic valve 16 is shown in one embodiment in which the valve body 40 has an atmospheric air inlet 42 which is connected to conduit 44 which is connected to the air filter 36. The valve body has a vacuum connector port 46 formed thereon which is adapted for connection to conduit 32 and the canister 2. Vacuum inlet 46 is connected to valving chamber 38 in which spring 16 biases valve member 30 to the upward position or in a direction away from the annular valve seat 50 formed in the upper end of chamber 38. Valving member 30 is connected to one end of the armature 28 which is received in a coil 26 mounted on a bobbin and armature guide 52. The upper end of the armature guide is preferably closed and has mounted adjacent thereto a reed switch 54 which is operative to be closed by movement of the armature upward such that the magnetic pole of the armature is adjacent the reed switch and magnetically closes the switch to complete a fault indication circuit (not shown) to the controller 12. The valve 16 has coil terminals 56, 58 which are connected respectively to the leads 22, 24 to the controller 12. It will be understood that additional terminals (not shown) are required for connection to reed switch 54.

The upward or open position of the valve 30; and, the upward position of the armature 28 are shown in dashed outline in FIG. 3.

Figure 4:
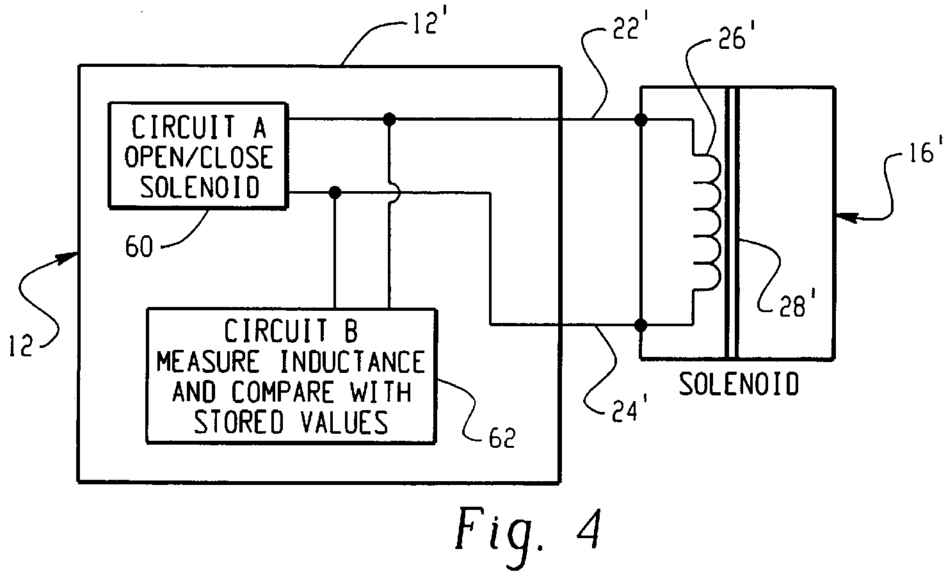
FIG. 4 is a schematic of another embodiment of the position detector for the valve of FIG. 1; and, FIG. 5 is a flow diagram of a subroutine of FIG. 2.

Referring to FIG. 4, an alternate embodiment of the diagnostic valve 16' is shown in which the controller 12' includes a driver circuit 60 which is operative to effect remote actuation and de-actuation of the solenoid coil 26 for opening and closing of the valve remotely. The controller 12' includes a second circuit 62 which is operative to measure the inductance of the coil 26 in both the actuated and de-actuated condition and to compare the measured value with stored values to determine the position of the armature. Electrically the techniques for accomplishing this are known in the art and will be omitted for the sake of brevity. Thus, the arrangement of FIG. 4 is deemed to be an alternative embodiment 16' of the diagnostic valve inasmuch as the reed switch 54 has been omitted from the embodiment 16'.

Referring to FIG. 3, the diameter of the valve seat 50 is chosen such that when the valve is actuated and valve member 30 seated on seat 50, if sub-atmospheric pressure in the canister or, in other words, the vacuum signal in port 46 is below a pre-selected value typically in the range of about eight to ten inches of water pressure (2 to 2.5 KPa), the pressure forces acting on the valve member 30 are sufficient to overcome the bias of spring 16 and hold the valve in a closed position. If the sub-atmospheric pressure rises above the pre-selected level of vacuum, the spring 16 is operative to move the valve 30 upwardly to the position shown in dashed outline and the armature causes the reed switch 54 to be actuated. It will be understood that the aforesaid function of the valve member and armature is the same for the arrangement of FIG. 4. It will also be understood that the valve position detectors described herein are not the only techniques which may be employed for detecting the position of the armature as, for example, optical detection techniques including photo detecting may be alternatively used.

It will also be understood that the diagnostic valve 16 need not be a solenoid operated valve; as, other types of valve operators may be employed, for example, bimetallic.

Figure 2:
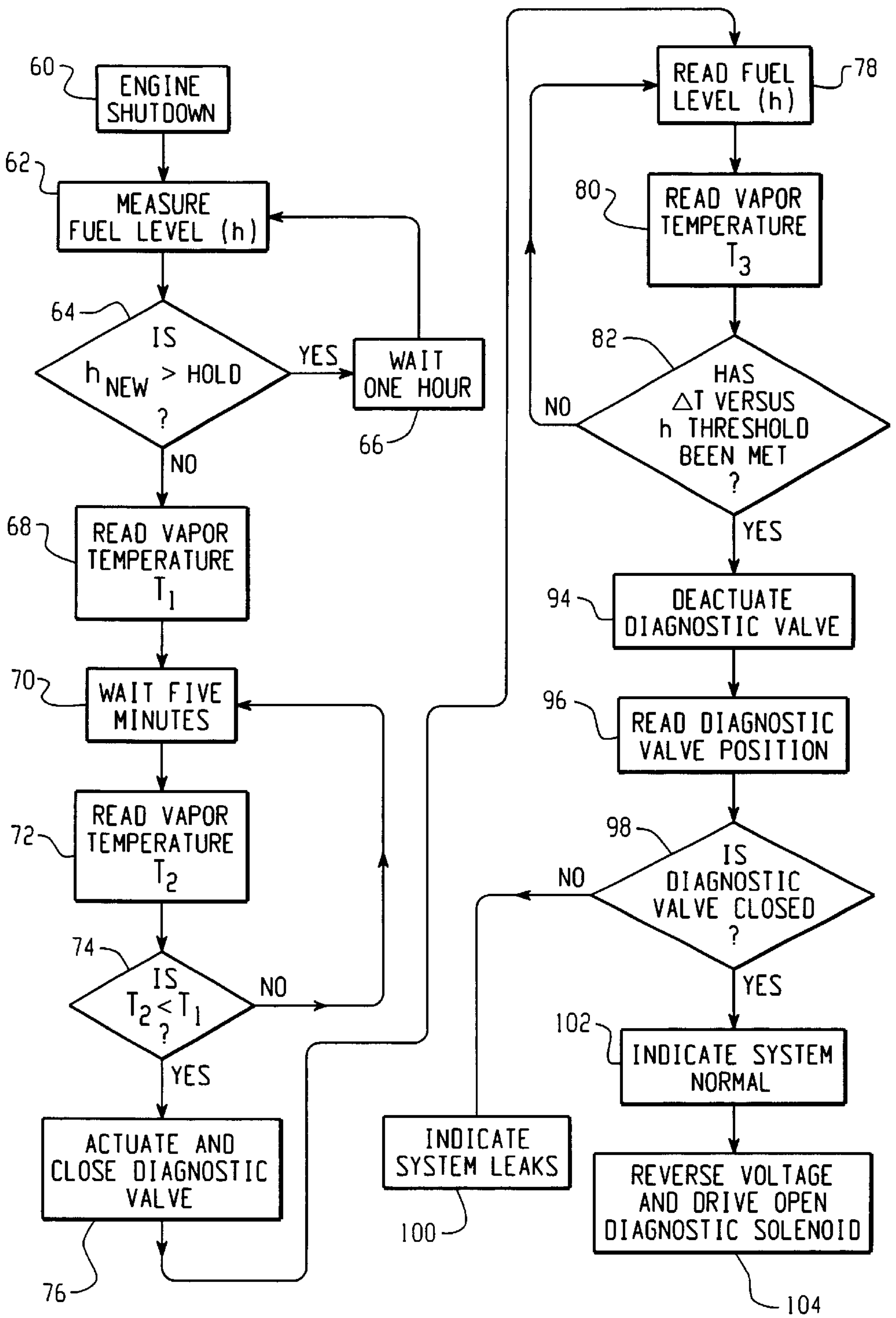
FIG. 2 is a flow diagram of the operation of the controller of the system of FIG. 1.

Referring to FIG. 2, the operation of the controller 12 is illustrated in flow diagram form wherein the diagnostic system 10 of the present invention is operational, upon engine shut-down at step 60, and proceeds to measure the fuel level at step 62 and then asks at step 64 whether the tank has been filled after engine shutdown. If the tank has been refueled and the determination at step 64 is affirmative, the system then enters a time delay at step 66 and returns to step 62 after the time delay. In the present practice of the invention the time delay is set at about one hour. If the determination at step 64 is negative, the system proceeds to step 68, reads the temperature of the fuel vapor in the tank as measured by the thermistor 14 and stores the reading as $T_1$.

The system then proceeds with a time delay of about five minutes, at step 70 and then proceeds to again read the vapor temperature at step 72 and store the value as $T_2$. The system then proceeds to step 74 and asks whether $T_2$ is less than $T_1$, or, in other words, whether the vapor in the tank has cooled. If the determination at step 74 is negative, the system returns to step 70. However, if the determination at step 74 is that the vapor has cooled, the system proceeds to step 76 and energizes the coil 26 of diagnostic valve 16 and closes the valve by applying a positive or forward direction direct current to the coil.

The system then proceeds to step 78 and reads the level of the liquid fuel in the tank and stores the reading as "h". The system them proceeds to step 80 and reads the temperature of the fuel vapor sensed by thermistor 14 and stores the value as $T_3$. The system then proceeds to step 82 and determines whether the vapor in the tank has cooled sufficiently for the amount of vapor in the tank to reach the desired drop in pressure in the tank as previously described.

Figure 5:
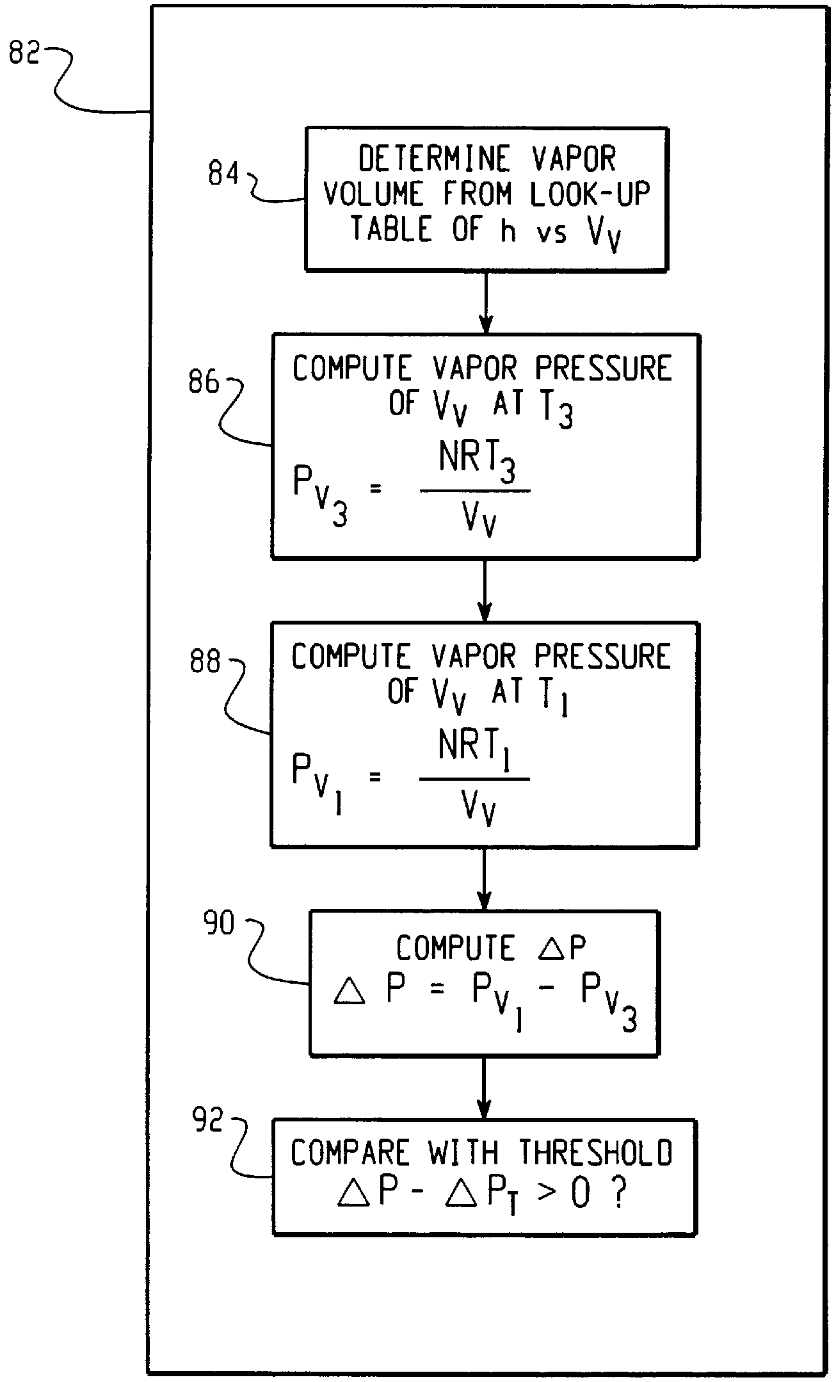

Referring to FIG. 5, the subroutine of step 82 is shown in further detail wherein the system determines the volume of vapor in the tank above the fluid level from a lookup table of values of vapor volume $V_V$ as a function the liquid level in the tank h as computed from the known tank geometry. The system then proceeds to step 86 and computes the vapor pressure $V_V$ at the temperature $T_3$ from the expression $$P_{v3} = \frac{NRT_3}{V_v}$$

where R is the universal or Rydberg gas constant and N is Avogadro's number.

The system them proceeds to step 88 and computes the vapor pressure $P_{V1}$ at $T_1$; and, then proceeds to step 90 and computes the change in pressure in the tank $\Delta_P$ by subtracting the vapor pressure computed at $T_3$ in step 86 from the pressure computed at $T_1$ in step 88. $\Delta p$ is thus the expected drop in pressure in the tank due to the temperature change provided that there are no leaks in the system. The system then proceeds to step 92 and compares the computed pressure difference $\Delta_P$ with the desired threshold.

Referring to FIG. 2, if the determination of step 82 is negative, the system returns to step 78. However, if the determination of step 82 is affirmative and the vapor in the tank has cooled by an amount of at least a desired threshold, the system proceeds to step 92 and de-actuates the diagnostic valve 16 by shutting off the current to the solenoid coil 26. The system then proceeds to step 96 and reads the position of the valve by determining whether switch 54 is open or closed or alternatively by comparing the measured inductance values as described with respect to FIG. 4. The system then proceeds to step 98 and asks whether the diagnostic valve is closed; and, if not, the system provides a fault or leak indication at step 100. If however the system determines at step 98 that the valve has remained closed, the system proceeds to provide an indication that no leaks exist at step 102 and then proceeds to step 104 and reverses the polarity of the current to the solenoid 26 and drives the valve 16 to the open position.

The present invention thus provides a simple and relatively low cost way of performing a diagnostic test on a fuel tank vapor system to determine whether or not the system is subject to leakage. A diagnostic air inlet valve is biased open with a predetermined force and is remotely actuated to the closed position after engine shutdown. Cooling of the fuel vapor in the tank is monitored. When the vapor has cooled a desired amount the vacuum formed by the change in pressure of the vapor is operative to hold the valve closed. If the system leaks, the pressure of the vapor will not fall to the expected vacuum level and the spring will force the valve open which is then determined by a valve position detector to indicate that leakage exists.

Although the invention has hereinabove been described with respect to the illustrated embodiments, it will be understood that the invention is capable of modification and variation and is limited only by the following claims.

What is claimed is:

1. A method of detecting vapor leaks in a motor vehicle fuel tank vapor management system of the type having a vapor storage canister comprising:

(a) disposing a valve in the air inlet of said canister and providing a fluid pressure responsive member in said valve and biasing said member to the open position with a predetermined force;

(b) sensing fuel vapor temperature in said tank and remotely actuating said valve to the closed position when the tank temperature has decreased by a predetermined amount;

(c) applying the tank pressure to said pressure responsive member and overcoming said predetermined force and holding said valve closed when said tank vapor pressure is below a certain sub-atmospheric vapor pressure and opening said valve with said predetermined force if said tank vapor pressure rises above said certain sub-atmospheric pressure.

(d) detecting the position of said valve and thereby determining that said valve is open and leakage is present in said system; and, (e) providing a fault indication when said leakage is present.

2. The method defined in claim 1, wherein said step of closing said valve for a predetermined interval includes electrically energizing said valve.

3. The method defined in claim 1, wherein said step of closing said valve for a predetermined interval includes electromagnetically actuating said valve.

4. The method defined in claim 1, wherein said step of sensing fuel vapor temperature includes disposing a thermistor at the top of said tank.

5. The method defined in claim 1, wherein said step of disposing a valve includes disposing a solenoid operated valve and said step of sensing valve position includes sensing the position of the solenoid armature.

6. The method defined in claim 1, wherein said step of disposing a valve includes disposing a solenoid operated valve and said step of sensing valve position includes moving an electrical contact with the solenoid armature.

7. The method defined in claim 1, wherein said step of sensing valve position includes inductively coupling to a moveable member.

8. The method defined in claim 1, wherein said step of remotely actuating and closing said valve includes electrically energizing a solenoid valve operator.

9. The method defined in claim 1, wherein said step of remotely actuating and closing said valve includes electrically energizing a solenoid with a direct current in one direction; and, in the event said valve does not reopen after a predetermined interval, energizing said solenoid with the direct current opposite said one direction.

10. In a combination a vehicle fuel tank and vapor purge control system having an air purged storage canister connected to a vapor vent valve in the tank and an on-board engine diagnostic system, the improvement comprising:

(a) a remotely controlled valve disposed in the purge air inlet of said canister;

(b) a temperature sensor disposed to sense the temperature of the fuel vapor in the tank and operative to provide an output indicative of the sensed temperature;

(c) a remotely operated diagnostic valve disposed in the purge air inlet of said canister, said test valve member biased to the open condition with a predetermined force and operatively responsive to be closed by remote operation and responsive to the vapor pressure in the canister to be held in the closed position when said vapor pressure reaches a predetermined threshold;

(d) means operative to provide an indication of the position of said valve member;

(e) a controller receiving said temperature sensor output and operative to effect said remote closing of said diagnostic valve upon actuation, wherein, upon vehicle engine shut down, said controller is operative in response to a decrease in said sensed vapor temperature, to actuate said valve to the closed position and maintain said valve actuated until said vapor temperature has decreased by a predetermined increment, whereupon said controller remotely de-actuates said valve; and, (f) said controller is responsive to the indication of valve position to indicate a condition of leakage if said vapor pressure has not reached said predetermined threshold to act on said pressure responsive valve member and to overcome said bias force and maintain said valve closed.

11. The improvement defined in claim 10, wherein said test valve is solenoid operated.

12. The improvement defined in claim 10, wherein said means operative to provide an indication of valve member position includes a switch actuated by movement of said valve member.

13. The improvement defined in claim 10, wherein said test valve is solenoid operated and said means operative to provide an indication of valve member position includes means operative to determine the inductance of said solenoid.

* * * * *